United States Patent
Takeda et al.

(10) Patent No.: US 7,736,535 B2
(45) Date of Patent: Jun. 15, 2010

(54) PHOSPHOR AND VACUUM ULTRAVIOLET EXCITED LUMINESCENT ELEMENT

(75) Inventors: Takashi Takeda, Sapporo-shi (JP); Kenji Ono, Nerima-ku (JP); Susumu Miyazaki, Kitasoma-gun (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 215 days.

(21) Appl. No.: 10/525,014

(22) PCT Filed: Aug. 28, 2003

(86) PCT No.: PCT/JP03/10900

§ 371 (c)(1),
(2), (4) Date: Feb. 17, 2005

(87) PCT Pub. No.: WO2004/020550

PCT Pub. Date: Mar. 11, 2004

(65) Prior Publication Data

US 2005/0269551 A1 Dec. 8, 2005

(30) Foreign Application Priority Data

Aug. 29, 2002 (JP) .............................. 2002-250353

(51) Int. Cl.
*C09K 11/79* (2006.01)
*C09K 11/78* (2006.01)
*H01J 11/02* (2006.01)

(52) U.S. Cl. ............................... 252/301.4 F; 313/486; 313/484; 313/582; 313/587

(58) Field of Classification Search ........... 252/301.4 F; 313/582, 587, 484, 486

See application file for complete search history.

(56) References Cited

U.S. PATENT DOCUMENTS

| | | | |
|---|---|---|---|
| 4,052,329 A | 10/1977 | Fukuda et al. | |
| 4,215,289 A * | 7/1980 | De Hair et al. | 313/486 |
| 4,810,930 A * | 3/1989 | Verlijsdonk et al. | 313/486 |
| 6,572,785 B2 * | 6/2003 | Justel et al. | 252/301.4 R |

FOREIGN PATENT DOCUMENTS

| | | | |
|---|---|---|---|
| EP | 21536 | * | 1/1981 |
| EP | 0021536 A1 | | 1/1981 |
| GB | 1 254 110 A | | 11/1971 |
| GB | 2 054 951 A | | 2/1981 |
| JP | 47-38587 A | | 12/1972 |
| JP | 48-38316 B1 | | 11/1973 |
| JP | 49-113784 A | | 10/1974 |
| JP | 57-30782 | * | 2/1982 |
| JP | 57-30782 A | | 2/1982 |
| JP | 59-193983 | * | 2/1984 |
| JP | 59-193983 A | | 11/1984 |
| JP | 10-140149 A | | 5/1998 |

OTHER PUBLICATIONS

H. Yamane, et al. "Crystal Structure and Thermal Expansion of $Ca_2Y_2Si_2O_9$", Materials Research Bulletin, vol. 33, No. 6, (1998), pp. 845-853.

English Translation of International Search Report mailed Nov. 25, 2003.

* cited by examiner

*Primary Examiner*—C. Melissa Koslow
(74) *Attorney, Agent, or Firm*—Sughrue Mion, PLLC

(57) ABSTRACT

A phosphor having high luminescence when excited by vacuum ultraviolet ray and a vacuum ultraviolet radiation excited light-emitting device comprising the phosphor. The phosphor comprises a metal oxide comprises at least one metal element $M^1$ selected from the group consisting of Ca, Sr and Ba, at least one metal element $M^2$ selected from the group consisting of Y, La, Gd and Lu, at least one metal element $M^3$ selected from the group consisting of Si and Ge and oxygen, and at least one metal element $Ln^1$ selected from the group consisting of Ce, Pr, Nd, Pm, Sm, Eu, Tb, Dy, Ho, Er, Tm, Yb, and Mn, as an activator.

3 Claims, No Drawings

PHOSPHOR AND VACUUM ULTRAVIOLET EXCITED LUMINESCENT ELEMENT

TECHNICAL FIELD

The present invention relates to a phosphor and a vacuum ultraviolet radiation excited light-emitting device comprising the phosphor. More particularly, the present invention relates to the phosphor having high luminescence when excited by vacuum ultraviolet ray and to the vacuum ultraviolet radiation excited light-emitting device comprising the phosphor.

BACKGROUND ART

Phosphors are used in a vacuum ultraviolet radiation excited light-emitting devices such as plasma display panels (hereafter abbreviated "PDP") and rare gas lamps. Phosphors which emit lights under excitation with vacuum ultraviolet rays have already been known. For example, $BaMgAl_{10}O_{17}$:Eu, $Zn_2SiO_4$:Mn and $(Y,Gd)BO_3$:Eu are practically used as a blue-emitting phosphor, a green-emitting phosphor and a red-emitting phosphor, respectively.

DISCLOSURE OF INVENTION

The object of the present invention is to provide a phosphor having high luminescence and suitable as the vacuum ultraviolet radiation excited light-emitting device.

Under this condition, as a result of research conducted by the present inventors in an attempt to solve the above problems, it has been found that a phosphor has high luminescence when excited by vacuum ultraviolet ray. Thus the present invention has been completed.

That is, the present invention provides a phosphor comprising a metal oxide comprises at least one metal element $M^1$ selected from the group consisting of Ca, Sr and Ba, at least one metal element $M^2$ selected from the group consisting of Y, La, Gd and Lu, at least one metal element $M^3$ selected from the group consisting of Si and Ge and oxygen, and at least one metal element $Ln^1$ selected from the group consisting of Ce, Pr, Nd, Pm, Sm, Eu, Tb, Dy, Ho, Er, Tm, Yb, and Mn, as an activator.

Moreover, the present invention provides the vacuum ultraviolet radiation excited light-emitting device comprising the above-mentioned phosphor The phosphor of the present invention is excited by vacuum ultraviolet ray and shows high luminescence. Particularly, the phosphor is preferably used in the vacuum ultraviolet radiation excited light-emitting device such as PDP and rare gas lamp. According to the present invention, the vacuum ultraviolet radiation excited light-emitting device having high luminescence is provided.

DETAILED DESCRIPTION OF THE INVENTION

The phosphor of the present invention comprises
a metal oxide comprises at least one metal element $M^1$ selected from the group consisting of Ca, Sr and Ba, at least one metal element $M^2$ selected from the group consisting of Y, La, Gd and Lu, at least one metal element $M^3$ selected from the group consisting of Si and Ge and oxygen, and
at least one metal element $Ln^1$ selected from the group consisting of Ce, Pr, Nd, Pm, Sm, Eu, Tb, Dy, Ho, Er, Tm, Yb, and Mn, as an activator, wherein $M^1$ is a divalent metal, $M^2$ is a trivalent metal, and $M^3$ is a tetravalent metal.

The phosphor of the present invention comprises preferably a metal oxide represented by formula (I):

$$M^1 M^2{}_m M^3{}_n O_{(2+3m+4n)/2} \qquad (I)$$

wherein m is from 0.5 to 1.5 and n is from 0.5 to 2.5).

The phosphor of the present invention exhibits emission of different colors depending on the kind of metal element used as the activator and the valence of the metal element. For example, when the activator is a trivalent Tb, the phosphor usually exhibits emission of green color. In this case, a part of the metal oxide $M^2$ is substituted with the trivalent Tb.

When the activator is a divalent Eu, the phosphor usually exhibits emission of blue color. In this case, a part of the metal oxide $M^1$ is substituted with the divalent Eu. When the activator is a trivalent Eu, the phosphor usually exhibits emission of red color. In this case, a part of the metal oxide $M^2$ is substituted with the trivalent Eu.

The first group of preferable phosphors of the present invention comprises both a metal oxide represented by formula $M^1{}_2 M^2{}_2 M^3{}_2 O_9$ (m=1 and n=1 in formula (I)) and activators of $Ln^1$ and $Ln^2$, and is represented by formula (II):

$$(M^1{}_{1-a} Ln^2{}_a)_2 (M^2{}_{1-b} Ln^1{}_b)_2 M^3{}_2 O_9 \qquad (II)$$

wherein $Ln^2$ is at least one element selected from the group consisting of Sm, Eu, Yb, and Mn, a is from 0 to 0.5, b is from 0 to 0.5, and the sum of a and b is not less than 0. Among the first group, a phosphor, which satisfies the condition of $0.03 \leq a+b \leq 0.3$, is more preferable.

The second group of preferable phosphors of the present invention comprises both a metal oxide of the formula $M^1{}_3 M^2{}_2 M^3{}_3 O_{10}$ (m=⅔ and n=⅔ in formula (I)) and activators of $Ln^1$ and $Ln^2$, and is represented by formula (III):

$$(M^1{}_{1-c} Ln^2{}_c)_3 (M^2{}_{1-d} Ln^1{}_d)_2 M^3{}_2 O_{10} \qquad (III)$$

wherein $Ln^2$ is at least one element selected from the group consisting of Sm, Eu, Yb and Mn), c is from 0 to 0.5, d is a from 0 to 0.5 and the sum of c and d is not less than 0. Among the second group, a phosphor, which satisfies the condition of $0.03 \leq c+d \leq 0.3$, is more preferable.

The third group of preferable phosphors of the present invention comprises both a metal oxide represented by formula $M^1{}_3 M^2{}_2 M^3{}_6 O_{18}$ (m=⅔ and n=2 in formula (I)) and activators of $Ln^1$ and $Ln^2$, and is represented by formula (IV):

$$(M^1{}_{1-e} Ln^2{}_e)_3 (M^2{}_{1-f} Ln^1{}_f)_2 M^3{}_6 O_{18} \qquad (IV)$$

wherein $Ln^2$ is at least one element selected from the group consisting of Sm, Eu, Yb, and Mn, e is from 0 to 0.5, f is from 0 to 0.5, and the sum of e and f is not less than 0. Among the third group, the phosphor, which satisfies the condition of $0.03 \leq e+f \leq 0.3$, is more preferable.

The method for producing the phosphor of the present invention will be explained below.

The method for producing the phosphor of the present invention is not specifically limited, and the phosphor may be produced, for example, by calcining a mixture of given metal compounds. The mixture of the given metal compounds is a mixture convertible to a phosphor comprising a metal oxide which comprises $M^1$, $M^2$, $M^3$ and oxygen(O), and $Ln^1$. The phosphor of the present invention is produced by weighing a $M^1$ containing compound (such as calcium compound, strontium compound, or barium compound), a $M^2$ containing compound (such as yttrium compound, lanthanide compound, gadolinium compound, or lutetium compound), a $M^3$ containing compound (such as silicon compound or germanium compound), and a $Ln^1$ containing compound (such as a compound which contains cerium, praseodymium, neodymium, promethium, samarium, europium, terbium, dysprosium, holmium, erbium, thulium, ytterbium or manganese) so as to give the desired composition, mixing these and calcining the mixture.

One of the preferable phosphors of the present invention, represented by formula $Ca_2(Y_{0.95}Eu_{0.05})_2Si_2O_9$, is produced, for example, by weighing calcium carbonate ($CaCO_3$), yttrium oxide ($Y_2O_3$), europium oxide ($Eu_2O_3$), and silicon oxide ($SiO_2$) so as to give that mole ratio of $CaCO_3:Y_2O_3:Eu_2O_3:SiO_2$ is equal to 1:0.475:0.025:1 (mole ratio of Ca:Y:Eu:Si is 1:0.95:0.05:1) mixing these and calcining the mixture under air at about 1600° C.

The raw materials used for producing the phosphor of the present invention, that is, a calcium compound, a strontium compound, a barium compound, a yttrium compound, a lanthanum compound, a gadolinium compound, a lutetium compound, a silicon compound and a germanium compound, include hydroxides, carbonates, nitrates, halides and oxalates, of high purity (99% or higher by weight) which decompose at high temperatures to be convertible to oxides, or oxides of high purity (99% or higher by weight).

Mixing of the raw material is usually conducted by using industrially employed ball mill, V-shape mixer, or stirring apparatus and the like.

When compounds such as hydroxides, carbonates, nitrates, halides, oxalate, which are convertible to oxides upon decomposition under air at high temperature are used as the raw materials, they may be pre-calcined before calcination. By pre-calcination a part of the above compounds in the mixture may be decomposed or water in the mixture may be removed. Pre-calcination may be conducted at temperature of from about 600° C. to about 900° C. The atmosphere used for the pre-calcination is not particularly limited, and there may be used any of oxidizing atmospheres, reducing atmospheres and inert atmospheres such as nitrogen or argon.

The obtained mixture or further pre-calcined mixture is calcined. Calcination is usually conducted under conditions of the temperature of from about 1000° C. to about 1700° C. for one hour to about 100 hours. A preferable calcination atmosphere depends on the kind of activator. For example, when the activator is praseodymium, neodymium, promethium, dysprosium, holmium, erbium or thulium, the calcination atmosphere is preferably an oxidizing atmosphere such as oxygen-containing argon, air and oxygen. When the activator is either cerium or terbium, the calcination atmosphere is preferably a reducing atmosphere such as nitrogen which contains 0.1-10% by volume of hydrogen, or argon which contains 0.1-10% by volume of hydrogen. When the activator is a multivalent metal element such as europium, ytterbium, samarium, or manganese, calcination is preferably conducted under the above-mentioned oxidizing atmosphere (such as oxygen-containing argon, air, oxygen) in viewpoint of heightening the valence of the metal element. On the other hand, calcination is preferably conducted under the above-mentioned reducing atmosphere (such as nitrogen which contains 0.1-10% by volume of hydrogen, argon which contains 0.1-10% by volume of hydrogen) in viewpoint of lowering the valence of metal element.

Calcination may be conducted in the presence of a proper amount of flux to accelerate the reaction. Furthermore, calcination may be conducted twice or more. Repetitive calcination may give phosphor particles with higher crystallinity.

The calcined product is, if necessary, ground, deagglomerated, washed, or classified. Grinding and deagglomeration, for example, may be conducted by using a ball mill or a jet mill.

The phosphor of the present invention obtained by the above method, has high luminescence by excitation with vacuum ultraviolet rays, and therefore, can be applied to a vacuum ultraviolet radiation excited light-emitting device such as a PDP and a rare gas lamp. The vacuum ultraviolet radiation excited light-emitting device comprises phosphor, typically comprises the above-mentioned phosphor, a plate and an electrode. More practically, the vacuum ultraviolet radiation excited light-emitting device comprises a rear plate, an address electrode, a barrier rib, a protective layer, a dielectric layer, a transparent electrode, a bus electrode, and a glass front plate.

A PDP comprising the phosphor of the present invention may be produced by a known method disclosed in Japanese Patent Application Laid-open No. 10-195428. Each of blue-emitting, green-emitting and red-emitting phosphors for vacuum ultraviolet radiation excited light-emitting devices is mixed with a binder comprising a cellulose compound, a polymer such as polyvinyl alcohol, and an organic solvent to prepare a phosphor paste. Each of the resulting paste is coated on an inner surface of a rear plate provided with address electrodes which is formed in a stripe shape by barrier ribs and on the surface of the barrier ribs by screen printing or the like followed by calcining at from 300° C. to 600° C. to form the respective phosphor layers. Thereon is superposed a surface glass plate provided with a dielectric layer and a protective layer on the inner surface thereof so that transparent electrodes and bus electrodes thereof are arranged in the direction perpendicular to the phosphor layers, and the superposed surface glass plate is bonded to the rear plate. The inside evacuated and a rare gas of low pressure such as Xe or Ne is sealed therein to form discharge spaces. Thus, a PDP is obtained.

EXAMPLE

The present invention will be explained in more detail by following examples, which should not be constructed as limiting the invention in any manner.

REFERENCE EXAMPLE

Calcium carbonate ($CaCO_3$, manufactured by Wako Pure Chemical Industries Ltd.), europium oxide ($Eu_2O_3$, manufactured by Shin-Etsu Chemical Co., Ltd.), magnesium carbonate ($MgCO_3$, manufactured by Kyowa Chemical Industries Ltd.), and silicon oxide ($SiO_2$, manufactured by Wako Pure Chemical Industries Ltd.) were weighed so as to give a mole ratio of $CaCO_3:MgCO_3:Eu_2O_3:SiO_2=0.97:1:0.015:2$ and these were mixed.

The mixture was calcined under argon(Ar) containing 2% by volume of hydrogen ($H_2$) at 1400° C. for 2 hours to obtain a phosphor represented by formula $(Ca_{0.97}Eu_{0.03})MgSi_2O_6$.

The obtained phosphor was placed in a vacuum chamber, the inside of which was kept at a vacuum of 6.7 Pa ($5\times10^{-2}$ Torr) or lower, was irradiated with ultraviolet rays using an excimer 146 nm lamp (Model H0012, manufactured by Ushio Inc.). The phosphor emits blue color and the luminance thereof was assumed to be 100.

Example 1

Calcium carbonate ($CaCO_3$, manufactured by Wako Pure Chemical Industries Ltd.), yttrium oxide ($Y_2O_3$, manufactured by Shin-Etsu Chemical Co., Ltd.), europium oxide ($Eu_2O_3$, manufactured by Shin-Etsu Chemical Co., Ltd.), and silicon oxide ($SiO_2$, manufactured by Wako Pure Chemical Industries Ltd.) were weighed so as to give a mole ratio of $CaCO_3:Y_2O_3:Eu_2O_3:SiO_2=0.95:0.5:0.025:1$ and these were mixed. The mixture was calcined under argon (Ar) containing 2% by volume of hydrogen ($H_2$) at 1400° C. for 2 hours to obtain a phosphor represented by formula $(Ca_{0.95}Eu_{0.05})_2Y_2Si_2O_9$ ($M^1$ is Ca, $M^2$ is Y, $M^3$ is Si, $Ln^2$ is Eu, a is 0.05 and b is 0 in formula (II)).

The obtained phosphor was placed in a vacuum chamber, the inside of which was kept at a vacuum of 6.7 Pa ($5\times10^{-2}$ Torr) or lower, was irradiated with ultraviolet rays using an excimer 146 nm lamp (Model H0012, manufactured by Ushio Inc.). The phosphor emits blue color and the luminance thereof was 108.

Example 2

Calcium carbonate ($CaCO_3$, manufactured by Wako Pure Chemical Industries Ltd.), yttrium oxide ($Y_2O_3$, manufactured by Shin-Etsu Chemical Co., Ltd.), europium oxide ($Eu_2O_3$, manufactured by Shin-Etsu Chemical Co., Ltd.), and silicon oxide ($SiO_2$, manufactured by Wako Pure Chemical Industries Ltd.) were weighed so as to give a mole ratio of $CaCO_3:Y_2O_3:Eu_2O_3:SiO_2=1:0.475:0.025:1$ and these were mixed. The mixture was calcined under air at 1600° for 2 hours to obtain a phosphor represented by formula $Ca_2(Y_{0.95}Eu_{0.05})_2Si_2O_9$ ($M^1$ is Ca, $M^2$ is Y, $M^3$ is Si, $Ln^1$ is Eu, a is 0 and b is 0.05 in formula (II)).

The obtained phosphor was placed in a vacuum chamber, the inside of which was kept at a vacuum of 6.7 Pa ($5\times10^{-2}$ Torr) or lower, was irradiated with ultraviolet rays using an excimer 146 nm lamp (Model H0012, manufactured by Ushio Inc.). The phosphor emits red color and the luminance thereof was 125.

Example 3

Calcium carbonate ($CaCO_3$, manufactured by Wako Pure Chemical Industries Ltd.), yttrium oxide ($Y_2O_3$, manufactured by Shin-Etsu Chemical Co., Ltd.), cerium oxide ($CeO_2$, manufactured by Shin-Etsu Chemical Co., Ltd.), and silicon oxide ($SiO_2$, manufactured by Wako Pure Chemical Industries Ltd.) were weighed so as to give a mole ratio of $CaCO_3:Y_2O_3:CeO_2:SiO_2=1:0.475:0.05:1$ and these were mixed. The mixture was calcined under air at 1400° C. for 2 hours to obtain a phosphor represented by formula $Ca_2(Y_{0.95}Ce_{0.05})_2Si_2O_9$ ($M^1$ is Ca, $M^2$ is Y, $M^3$ is Si, $Ln^1$ is Ce, a is 0 and b is 0.05 in formula (II)).

The obtained phosphor was placed in a vacuum chamber, the inside of which was kept at a vacuum of 6.7 Pa ($5\times10^{-2}$ Torr) or lower, was irradiated with ultraviolet rays using an excimer 146 nm lamp (Model H0012, manufactured by Ushio Inc.). The phosphor emits blue color and the luminance thereof was 107.

The invention claimed is:

1. A phosphor represented by formula

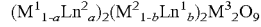
$$(M^1_{1-a}Ln^2_a)_2(M^2_{1-b}Ln^1_b)_2M^3_2O_9$$

wherein $M^1$ is at least one metal element selected from the group consisting of Ca, Sr, and Ba, $M^2$ is at least one metal element selected from the group consisting of Y, La, Gd, and Lu, $M^3$ is at least one metal element selected from the group consisting of Si and Ge and oxygen, $Ln^1$ is at least one metal element selected from the group consisting of Ce, Pr, Nd, Pm, Sm, Eu, Tb, Dy, Ho, Er, Tm, Yb, and Mn, $Ln^2$ is at least one element selected from the group consisting of Sm, Eu, Yb, and Mn, a is from 0 to 0.5, b is from 0 to 0.5, and the sum of a and b is not less than 0.

2. A phosphor represented by formula

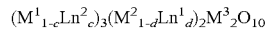
$$(M^1_{1-c}Ln^2_c)_3(M^2_{1-d}Ln^1_d)_2M^3_2O_{10}$$

wherein $M^1$ is at least one metal element selected from the group consisting of Ca, Sr, and Ba, $M^2$ is at least one metal element selected from the group consisting of Y, La, Gd, and Lu, $M^3$ is at least one metal element selected from the group consisting of Si and Ge and oxygen, $Ln^1$ is at least one metal element selected from the group consisting of Ce, Pr, Nd, Pm, Sm, Eu, Tb, Dy, Ho, Er, Tm, Yb, and Mn, $Ln^2$ is at least one element selected from the group consisting of Sm, Eu, Yb and Mn, c is from 0 to 0.5, d is a from 0 to 0.5, and the sum of c and d is not less than 0.

3. A vacuum ultraviolet radiation excited light-emitting device comprising the phosphor according to claim 1 or 2.

* * * * *